United States Patent
Weisz et al.

(10) Patent No.: US 11,663,851 B2
(45) Date of Patent: May 30, 2023

(54) DETECTING AND NOTIFYING FOR POTENTIAL BIASES IN ARTIFICIAL INTELLIGENCE APPLICATIONS

(71) Applicant: INTERNATIONAL BUSINESS MACHINES CORPORATION, Armonk, NY (US)

(72) Inventors: Justin David Weisz, Scarsdale, NY (US); Abhishek Bhandwaldar, Somerville, MA (US); Maryam Ashoori, Scarsdale, NY (US); Arunima Chaudhary, Dehradun (IN); Benjamin Hoover, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/790,672

(22) Filed: Feb. 13, 2020

(65) Prior Publication Data

US 2021/0256832 A1 Aug. 19, 2021

(51) Int. Cl.
| | |
|---|---|
| *G06V 40/16* | (2022.01) |
| *G08B 21/24* | (2006.01) |
| *G06N 5/02* | (2023.01) |
| *G10L 25/51* | (2013.01) |
| *G06V 20/40* | (2022.01) |
| *G06V 10/74* | (2022.01) |
| *G06V 40/20* | (2022.01) |

(52) U.S. Cl.
CPC ............ *G06V 40/168* (2022.01); *G06N 5/02* (2013.01); *G06V 10/761* (2022.01); *G06V 20/46* (2022.01); *G06V 40/20* (2022.01); *G08B 21/24* (2013.01); *G10L 25/51* (2013.01)

(58) Field of Classification Search
CPC .......... G08B 21/24; G06N 5/02; G10L 25/51; G06K 9/00268; G06K 9/00744
See application file for complete search history.

(56) References Cited

U.S. PATENT DOCUMENTS

| | | |
|---|---|---|
| 6,173,069 B1 | 1/2001 | Daly et al. |
| 6,463,163 B1 | 10/2002 | Kresch |
| 7,027,619 B2 | 4/2006 | Pavlidis et al. |

(Continued)

OTHER PUBLICATIONS

Mell, P. et al., "Recommendations of the National Institute of Standards and Technology"; NIST Special Publication 800-145 (2011); 7 pgs.

(Continued)

*Primary Examiner* — Mohamed Barakat
*Assistant Examiner* — Sharmin Akhter
(74) *Attorney, Agent, or Firm* — Intelletek Law Group, PLLC; Gabriel Daniel, Esq.

(57) ABSTRACT

An implicit bias monitoring system is provided. The system receives sensor data including video and audio that are captured during an interaction between a first individual and a second individual. The system determines a set of attributes associated with the interaction based on the received sensor data, the set of attributes comprising at least one of race and gender of the second individual. The system detects an implicit bias based on a combination of the determined set of attributes and a bias profile. The system generates an alert based on the detected implicit bias.

17 Claims, 6 Drawing Sheets

(56) References Cited

U.S. PATENT DOCUMENTS

| | | | |
|---|---|---|---|
| 9,507,778 | B2 | 11/2016 | Jaffe et al. |
| 10,007,721 | B1 | 6/2018 | Klein et al. |
| 2014/0226855 | A1 | 8/2014 | Savvides et al. |
| 2015/0286858 | A1* | 10/2015 | Shaburov ............. G06V 40/171 |
| | | | 382/103 |
| 2016/0300135 | A1* | 10/2016 | Moudy ................... G06F 40/20 |
| 2019/0164170 | A1* | 5/2019 | Kataria ................ G06Q 10/105 |
| 2020/0134295 | A1* | 4/2020 | el Kaliouby ........... G06V 40/18 |
| 2020/0334306 | A1* | 10/2020 | Baughman .............. G06F 3/167 |

OTHER PUBLICATIONS

Taylor, C., "From Bias to Behavior: Predicting Prejudice Towards Autistic Individuals"; W&M ScholarWorks (2018); 61 pgs.

Persson, A., "Implicit Bias in Predictive Data Profiling within Recruitments"; ResearchGate (2017); 16 pgs.

Carbune, V. et al., "Incremental Sharing Using Machine Learning", Technical Disclosure Commons (2018), 33 pgs.

Bellamy, R., et al., "AI Fairness 360: an Extensible Toolkit for Detecting, Understanding, and Mitigating Unwanted Algorithmic Bias"; arXiv:1810.01943v1 [cs.AI] Oct. 3, 2018, 20 pgs.

Kumar, A., "Bias Detection in Machine Learning Models Using FairML" DZone (2018), 5 pgs.

* cited by examiner

DETECTING AND NOTIFYING FOR POTENTIAL BIASES IN ARTIFICIAL INTELLIGENCE APPLICATIONS

BACKGROUND

Technical Field

The present disclosure generally relates to real-time systems based on Artificial Intelligence (AI).

Description of the Related Arts

As machines become increasingly capable, tasks considered to require human intelligence can be delegated to machine to perform. Modern artificial intelligence systems are capable of performing tasks such as understanding human speech, competing in strategic game systems, autonomously operating cars, routing content in delivery network, etc. Advances have been made in various fields of AI, including reasoning, knowledge representation, planning, learning, natural language processing, perception, and the ability to move and manipulate objects.

SUMMARY

Some embodiments of the disclosure provide an implicit bias monitoring system. The implicit bias monitoring system receives sensor data that are captured during an interaction between a first individual and a second individual. The received sensor data may include video and audio data that are captured by a combination of on-body and/or environmental sensors. The implicit bias monitoring system determines a set of attributes associated with the interaction based on the received sensor data. The determined set of attributes may include one or more of age, race, gender, religion, nationality, and disability of the first individual and/or the second individual. The implicit bias monitoring system detects one or more implicit biases based on a combination of the determined set of attributes and a bias profile. The implicit bias monitoring system generates an alert based on the detected implicit bias.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Taking advantage of the advancement of artificial intelligence (AI) technologies over the recent years, some embodiments of the disclosure provide a system for monitoring implicit biases and for providing a real time notification to a human user about handling unintended, or implicit biases. The system uses a combination of sensors to determine when an interaction begins with another person, and then uses AI technologies to analyze or classify the sensors' outputs to determine a particular set of attributes about the interaction (e.g., attributes of a person that are legally protected from discrimination such as age, race, gender, disability). The system combines, correlates, or compares the determined attributes with a pre-existing profile of implicit bias in order to determine potential areas in which the user may have biases. Thus, if the user of a system has a pre-existing profile of implicit bias that matches the detected attributes of a person encountered by the user, the system notifies the user to warn of the implicit biases.

Figure 1:
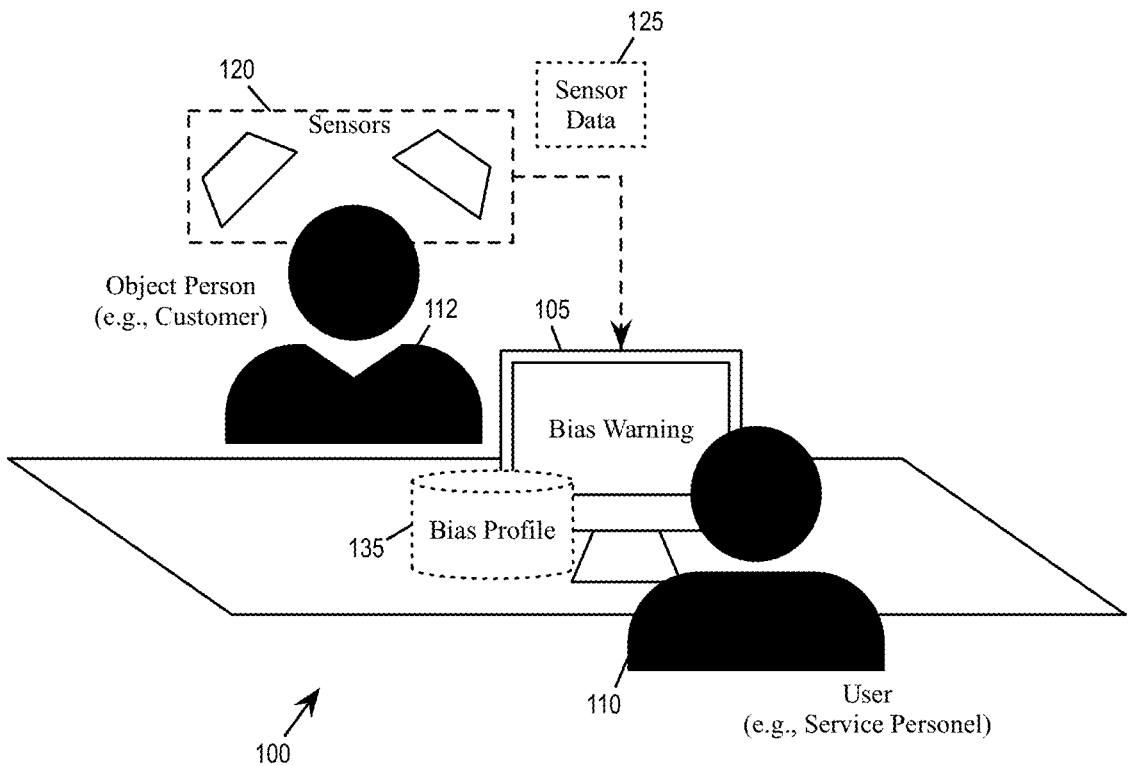
FIG. 1 illustrates an example implicit bias monitoring system.

FIG. 1 illustrates an example implicit bias monitoring system 100. The user 110 may use the implicit bias monitoring system 100 to become aware of his or her implicit biases in real-time settings and be vigilant in his or her interaction to avoid making biased decisions or exhibiting biased behaviors. This is particularly useful for users in a customer-facing role, such as cashiers, bank tellers, restaurant staff, bartenders, police officers, firemen, and other service professionals.

The system 100 is implemented by a computing device 105. As illustrated, a user 110 is using the implicit bias monitoring system 100 to monitor his or her interaction with another person 112 for possible implicit bias. This other person 112 may be the user's customer, and the user 110 and the customer 112 are two parties of the monitored interaction. The implicit bias monitoring system 100 generates an implicit bias alert 130 in real time to the user 110 when the system determines that the monitored interaction between the user 110 and the customer 112 indicates likely bias by the user 110.

The system 100 is equipped with a set of sensors 120 for capturing sensor data and/or measurements 125 related to the interaction. The sensors 120 may include a combination of on-body and/or environmental sensors, such as police-worn on-body cameras, smart glasses, smartphones with camera and microphone, drones with camera, fixed environmental sensors such as close-circuit television (CCTV) systems. The system 100 in turn analyzes the captured sensor data 125 in view of a bias profile 135 to generate the bias alert 130. The user 110 is notified of the generated bias alert 130 through an output device (e.g., a display or communications device) of the computing device 105.

Figure 2:
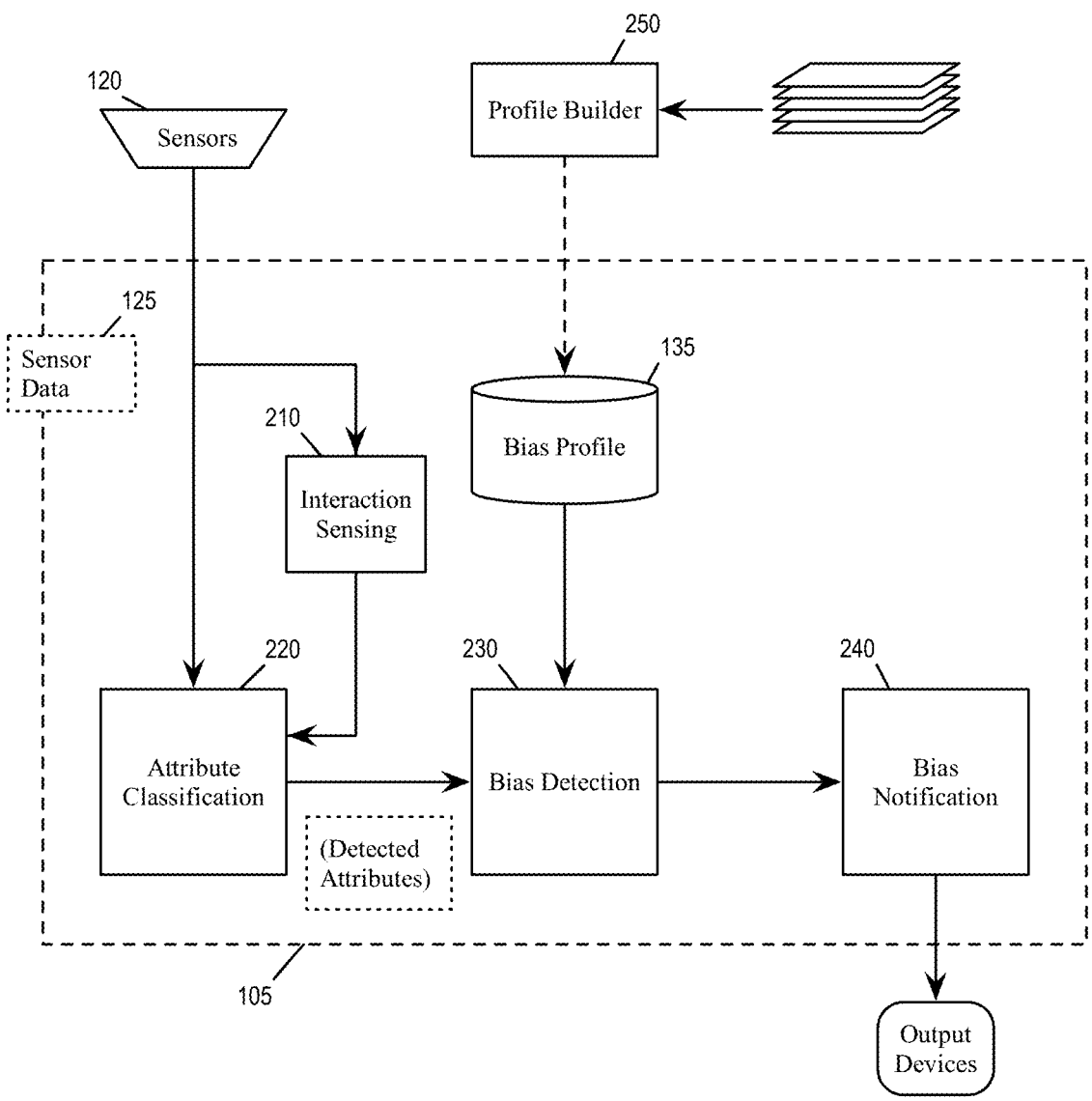
FIG. 2 illustrates components of the implicit bias monitoring system.

FIG. 2 illustrates the components of the implicit bias monitoring system 100. As illustrated, the computing device 105 implements the system 100 by implementing an interaction sensing module 210, an attribute classification module 220, a bias detection module 230, and a bias notification module 240. In some embodiments, the modules 210-240 are modules of software instructions being executed by one or more processing units (e.g., a processor) of the computing device 105. In some embodiments, the modules 210-240 are workloads being performed by a computing cloud. In some embodiments, the modules 210-240 are modules of hardware circuits implemented by one or more integrated circuits (ICs) of an electronic apparatus. Though the modules 210, 220, 230, and 240 are illustrated as being separate modules, some of the modules can be combined into a single module. For example, the functionalities of the interaction sensing module 210 and the attribute classification module 220 can be merged into one data processing module. An example computing device 400 that may implement the computing device 105 will be described by reference to FIG. 4 below.

In some embodiments, the implicit bias monitoring system 100 uses the video images captured by camera to detect, count, and localize one or more subjects. The implicit bias monitoring system 100 may also perform facial detection based on the captured video images. In some embodiments, the implicit bias monitoring system 100 uses speech-to-text and visual recognition techniques to classify attributes of the individuals involved in the interaction. In some embodiments, the implicit bias monitoring system 100 derives insight from video images by using commercially available software that are capable of performing image classification and objection detection, including those that operate in the computing cloud.

The interaction sensing module 210 receives real-time streams of audio, video and other types of sensor data 125 from the sensors 120. The object recognition module 210 determines when an interaction has begun with the customer based on the received sensor data 125.

The attribute classification module 220 uses AI classification techniques to determine a set of attributes of the interaction between the user 110 and the customer 112 based on visual and auditory information available in the received sensor data 125. In some embodiments, the attribute classification module 220 in real-time identifies visual objects in video of the interaction, visual objects such participant of the interaction (the user and the customer), faces, facial features, limbs, clothing, apparel, accessory, jewelry, etc. The attribute classification module 220 may also in real-time identify audible objects in audio of the interaction, audible objects such as words, phrases, idioms, accent, etc. The attribute classification module 220 may also identify gestures and body languages. The attribute classification module 220 may include auditory and/or speech classifiers that are trained to understand thought processes and speech patterns based on auditory information available in the received sensor data 125.

Based at least partly on the recognized objects, the attribute classification module 220 classifies different aspects of the interaction into one or more attributes. For example, the attributes of the interaction may include the gender, age, race, disability, nationality, religion, or groupings of other personal traits of the user and/or of the customer. The attribute classification module 220 may also classify the interaction into one or more contexts, e.g., negotiation, purchasing, friendly bantering, acting, polite greeting, reciting, quoting, inquiry and response, etc. Example attributes of the interaction may include "user's nationality is A", "customer's race is B", "the context of the interaction is X", "customer's disability status is Y", "user made a gesture Z", etc.

The bias detection module 230 identifies possible implicit bias based on the attributes determined by the attribute classification module 220. Once the system senses that an interaction between two individuals has been established (by the interaction sensing module 210), and the attributes of the interaction have been determined (by the attribute classification module 220), the bias detection module 230 compares or correlates the determined attributes with the pre-existing bias profile 135. The direction of bias is also determined, e.g., whether the bias is for or against the customer 112 based on a particular attribute.

The bias profile 135 includes a set of templates, predetermined parameters, criteria, or functions that are used to identify possible bias based on attributes of persons as well as patterns of speech and behaviors in the interaction. The profile may be determined ahead of time by e.g., calculating the disparity in outcome (user behavior, decisions made, the quality of service, etc.,) across different groups having different attributes; maintaining a historical profile based on records or data of how people in similar situations have acted; and/or collecting news articles and incidents reported in media as a source to identify implicit biases of a special group with respect to other groups in a population. In some embodiments, the bias profile 135 is continuously updated in real-time as the computing device 105 may be connected to the Internet to receive real-time information. As illustrated, a profile builder 250 generates or updates the profile 135 for the implicit bias monitoring system 100.

In some embodiments, the bias profile 135 defines several bias scenarios, and the bias detection module 230 determines which among the defined bias scenarios matches the monitored interaction based on the identified attributes of the user and the customer. For example, a particular bias scenario in the bias profile may be matched if the user is determined to be of a first ethnicity (e.g., based on attributes such as facial features, skin colors, speech patterns, etc.) and the customer is determined to be of a second ethnicity and the user has said certain specific phrases or made certain specific gestures in a certain context. In some embodiments, the bias profile 135 defines various bias detection functions, each bias detection function outputs a score for a particular type of bias based on the attributes identified by the attribute classification module 220. The bias detection module 230 may determine that there is bias if one or more of the bias scenarios are matched, or one or more of the bias detection functions output scores that are greater than a certain threshold.

The bias notification module 240 notifies the user by e.g., generating the implicit bias alert 130 when a bias for or against one or more traits has been determined. In some embodiments, the bias profile 135 associates each bias scenario with a warning or a recommendation that can be incorporated into the implicit bias alert 130. The bias notification module 240 may generate the implicit bias alert 130 as an alert on a computer screen, as a notification in a smart glasses, as alert in a smartphone, or as a phone call. The bias notification module 240 may display the implicit bias alert 130 on a display device of the computing device 100, or communicates the alert 130 to another computing device through a communications medium or network. The bias notification module 240 may also generate a notification for another customer service agent to step in and join the interaction.

Figure 3:
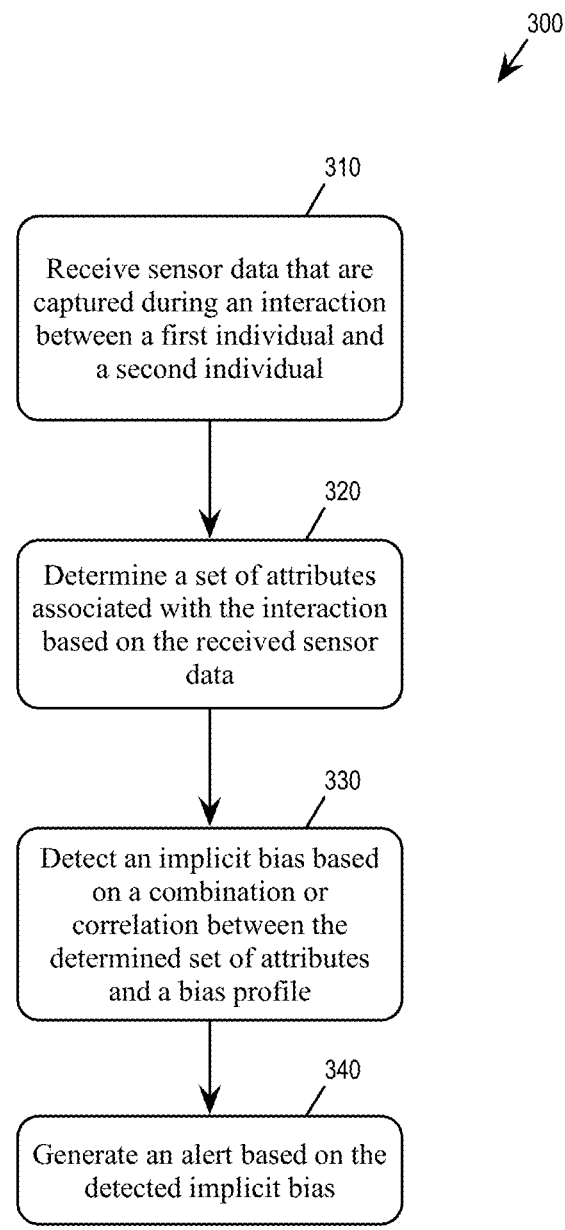
FIG. 3 conceptually illustrates a process for monitoring implicit bias, consistent with an exemplary embodiment.

FIG. 3 conceptually illustrates a process 300 for monitoring implicit bias, consistent with an exemplary embodiment. In some embodiments, one or more processing units (e.g., processor) of a computing device implementing the implicit bias monitoring system 100 (e.g., the computing device 105) perform the process 300 by executing instructions stored in a computer readable medium.

The implicit bias monitoring system receives (at 310) sensor data that are captured during an interaction between a first individual (e.g., the user of the system 100) and a second individual (e.g., a customer of the user). The received sensor data may include video and audio data that are captured by a combination of on-body and/or environmental sensors.

The implicit bias monitoring system determines (at 320) a set of attributes associated with the interaction based on the received sensor data. The determined set of attributes may include one or more of age, race, gender, religion, nationality, and disability of the first individual and/or the second individual. The system may determine the set of attributes associated with the interaction by e.g., identifying visual and audible objects in the received sensor data, determining thought processes and speech patterns based on auditory information in the received sensor data, etc.

The implicit bias monitoring system detects (at 330) one or more implicit biases based on a combination (e.g., comparison or correlation) of the determined set of attributes and a bias profile. For example, the bias profile may specify criteria for identifying one or more types of biases based on attributes associated with interactions between individuals.

The implicit bias monitoring system generates (at 340) an alert based on the detected implicit bias. The generated alert may be displayed on a display device of the computing device, or communicated to another computing device.

By implementing real-time classification of attributes associated with an interaction between two individuals, the implicit bias monitoring system is able to help its user to become aware of his implicit biases in a real-time setting (e.g., a service professional in a customer facing role) in a way that is impossible without the aid of a machine or computing device. Furthermore, the use of a bias profile enables the detection of implicit bias to be automated.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 3) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
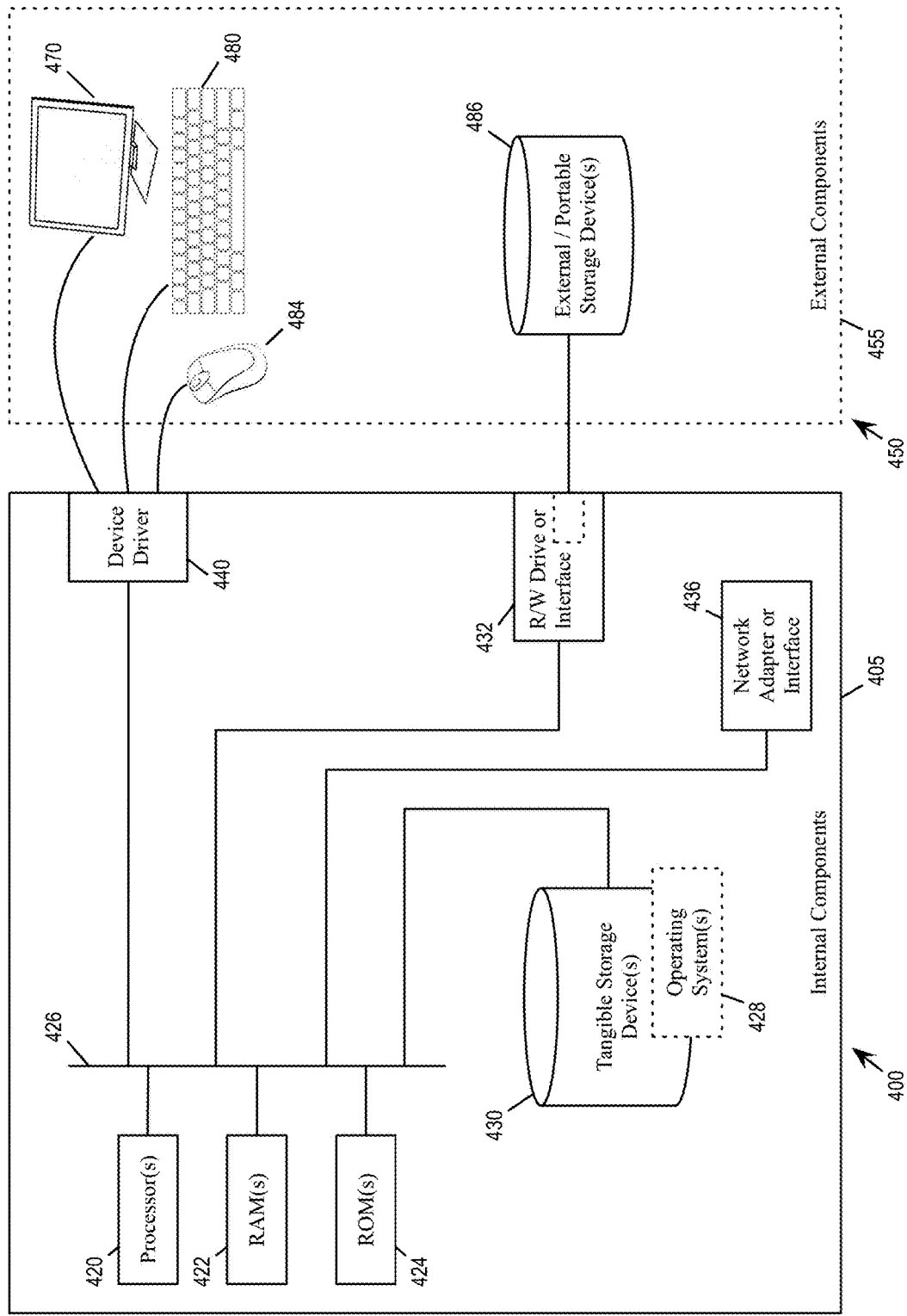
FIG. 4 shows a block diagram of the components of a data processing system in accordance with an illustrative embodiment of the present disclosure.

FIG. 4 shows a block diagram of the components of data processing systems 400 and 450 that may be used to implement a system for monitoring implicit biases (i.e., the implicit bias monitoring system 100) in accordance with an illustrative embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

Data processing systems 400 and 450 are representative of any electronic device capable of executing machine-readable program instructions. Data processing systems 400 and 450 may be representative of a smart phone, a computer system, PDA, or other electronic devices. Examples of computing systems, environments, and/or configurations that may represented by data processing systems 400 and 450 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 400 and 450 may include a set of internal components 405 and a set of external components 455 illustrated in FIG. 4. The set of internal components 405 includes one or more processors 420, one or more computer-readable RAMs 422 and one or more computer-readable ROMs 424 on one or more buses 426, and one or more operating systems 428 and one or more computer-readable tangible storage devices 430. The one or more operating systems 428 and programs such as the programs for executing the process 300 are stored on one or more computer-readable tangible storage devices 430 for execution by one or more processors 420 via one or more RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

The set of internal components 405 also includes a R/W drive or interface 432 to read from and write to one or more portable computer-readable tangible storage devices 486 such as a CD-ROM, DVD, memory stick, magnetic tape, magnetic disk, optical disk or semiconductor storage device. The instructions for executing the process 300 can be stored on one or more of the respective portable computer-readable tangible storage devices 486, read via the respective R/W drive or interface 432 and loaded into the respective hard drive 430.

The set of internal components 405 may also include network adapters (or switch port cards) or interfaces 436 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 436. From the network adapters (or switch port adaptors) or interfaces 436, the instructions and data of the described programs or processes are loaded into the respective hard drive 430. The network may comprise copper wires, optical fibers, wireless transmission, routers, firewalls, switches, gateway computers and/or edge servers.

The set of external components 455 can include a computer display monitor 470, a keyboard 480, and a computer mouse 484. The set of external components 455 can also include touch screens, virtual keyboards, touch pads, pointing devices, and other human interface devices. The set of internal components 405 also includes device drivers 440 to interface to computer display monitor 470, keyboard 480 and computer mouse 484. The device drivers 440, R/W drive or interface 432 and network adapter or interface 436 comprise hardware and software (stored in storage device 430 and/or ROM 424).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 5:
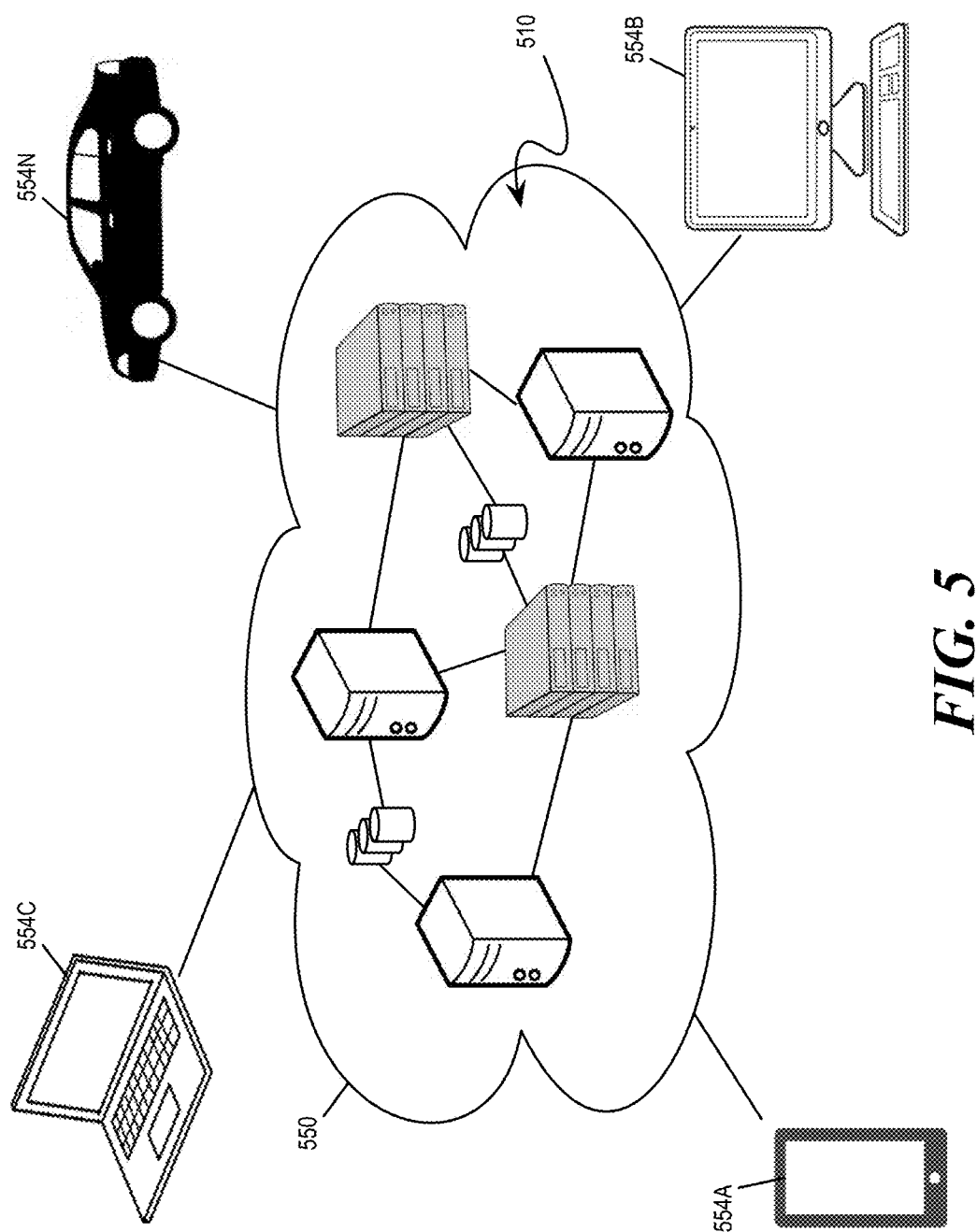
FIG. 5 illustrates an example cloud-computing environment.

Referring now to FIG. 5, an illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
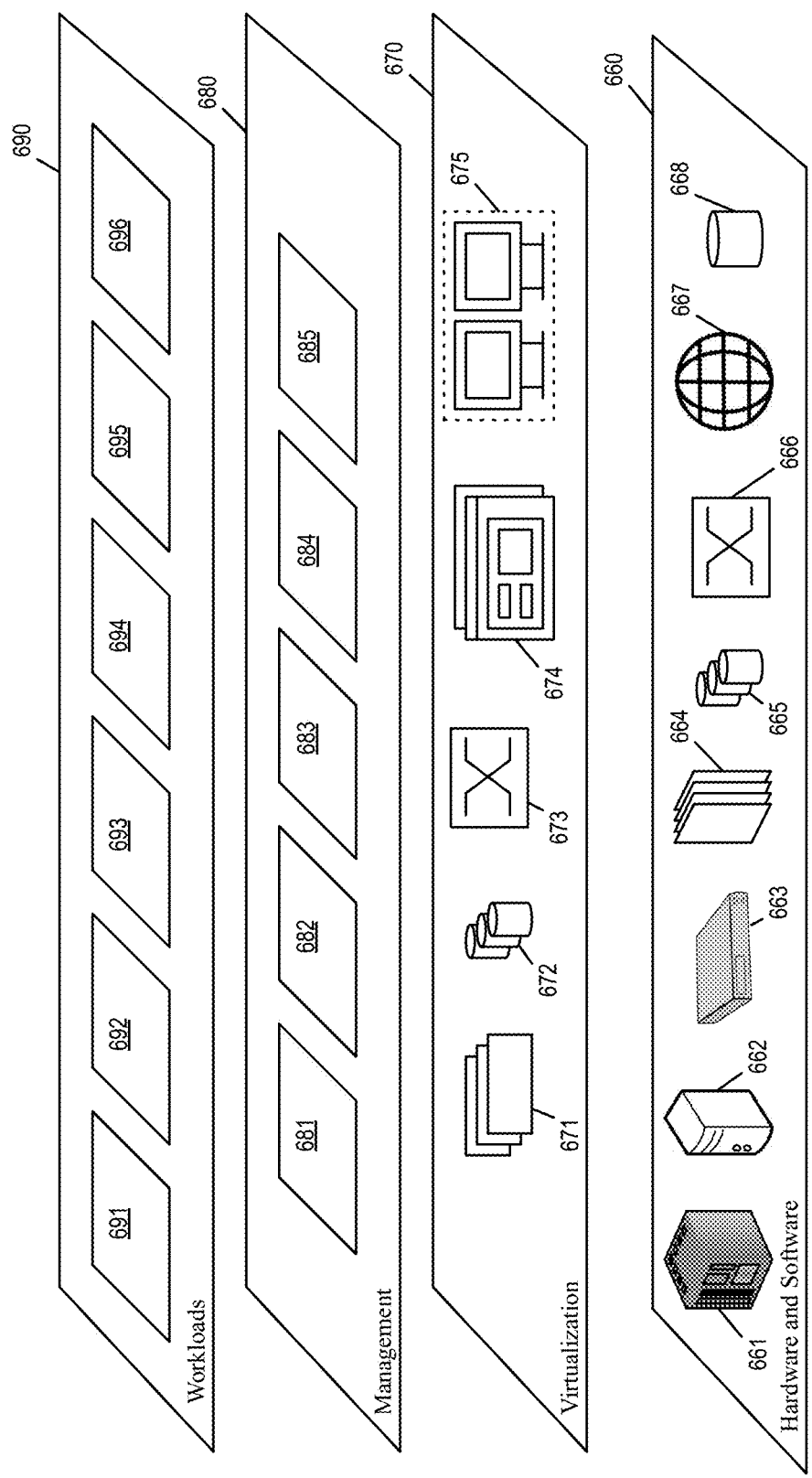
FIG. 6 illustrates a set of functional abstraction layers provided by a cloud-computing environment, consistent with an exemplary embodiment.

Referring now to FIG. 6, a set of functional abstraction layers provided by cloud computing environment 550 (of FIG. 5) is shown. It should be understood that the components, layers, and functions shown in FIG. 6 are intended to be illustrative only and embodiments of the disclosure are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud-computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and workload 696. In some embodiments, the workload 696 performs some of the operations of the implicit bias monitoring system 100, e.g., attribute classification.

The foregoing one or more embodiments implement implicit bias monitoring system within a computer infrastructure by having one or more computing devices performing object recognition, attribution classification, and implicit bias detection based on a bias profile. Further, the computer infrastructure is used to generate and deliver an implicit bias alert to its user.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts comprising:
receiving sensor data comprising video and audio that are captured during an interaction between a first individual and a second individual, wherein the sensor data is based on both the first individual and the second individual;
determining a set of attributes associated with the interaction based on the received sensor data, the set of attributes comprising legally protected attributes of the first individual and the second individual;
detecting a prospective implicit bias of the second individual based on a combination of the determined set of attributes and a bias profile; and
generating an alert based on the detected prospective implicit bias, which is sent to the second individual in real-time, to avoid making a biased decision or exhibiting a biased behavior in a present interaction.

2. The computing device of claim 1, wherein determining the set of attributes comprises identifying visual objects in the received sensor data.

3. The computing device of claim 2, wherein the identified visual objects comprise facial features of the first and second individuals.

4. The computing device of claim 1, wherein the bias profile comprises criteria for identifying one or more types of biases based on attributes associated with interactions.

5. The computing device of claim 1, wherein the bias profile defines one or more bias detection functions, each bias detection function outputting a score for a particular type of bias based on the determined set of attributes.

6. The computing device of claim 1, wherein the generated alert is displayed on a display device of the computing device.

7. A computer program product comprising:
one or more non-transitory computer-readable storage devices and program instructions stored on at least one of the one or more non-transitory storage devices, the program instructions executable by a processor, the program instructions comprising sets of instructions for:
receiving sensor data comprising video and audio that are captured during an interaction between a first individual and a second individual, wherein the sensor data is based on both the first individual and the second individual;
determining a set of attributes associated with the interaction based on the received sensor data, the set of attributes comprising legally protected attributes of the first individual and of the second individual;
detecting a prospective implicit bias of the second individual based on a combination of the determined set of attributes and a bias profile; and
generating an alert based on the detected implicit bias, which is sent to the second individual in real-time, to avoid making a biased decision or exhibiting a biased behavior in a present interaction.

8. The computer program product of claim 7, wherein determining the set of attributes comprises identifying visual objects in the received sensor data.

9. The computer program product of claim 8, wherein the identified visual objects comprise facial features of the first and second individuals.

10. The computer program product of claim 7, wherein the bias profile comprises criteria for identifying one or more types of biases based on attributes associated with interactions.

11. The computer program product of claim 7, wherein the bias profile defines one or more bias detection functions, each bias detection function outputting a score for a particular type of bias based on the determined set of attributes.

12. A computer-implemented method comprising:
receiving, at a computing device, sensor data comprising video and audio that are captured during an interaction between a first individual and a second individual, wherein the sensor data is based on both the first individual and the second individual;

determining a set of attributes associated with the interaction based on the received sensor data, the set of attributes comprising legally protected attributes of the first individual and of the second individual;

detecting a prospective implicit bias of the second individual based on a combination of the determined set of attributes and a bias profile; and generating an alert based on the detected prospective implicit bias, which is sent to the second individual in real-time, to avoid making a biased decision or exhibiting a biased behavior in a present interaction.

13. The computer-implemented method of claim 12, wherein determining the set of attributes comprises identifying visual objects in the received sensor data.

14. The computer-implemented method of claim 13, wherein the identified visual objects comprise facial features of the first and second individuals.

15. The computer-implemented method of claim 12, wherein the bias profile comprises criteria for identifying one or more types of biases based on attributes associated with interactions.

16. The computer-implemented method of claim 12, wherein determining the set of attributes further comprises determining thought processes and speech patterns based on auditory information in the received sensor data.

17. The computer-implemented method of claim 12, further comprising displaying the generated alert on a display device of the computing device.

* * * * *